Nov. 6, 1962 H. W. MOORE Re. 25,281

APPARATUS FOR AND METHOD OF WINDING STATOR COILS

Original Filed May 29, 1958 2 Sheets-Sheet 1

INVENTOR.
HARRY W. MOORE

BY

HIS ATTORNEYS

APPARATUS FOR AND METHOD OF WINDING STATOR COILS

Original Filed May 29, 1958 2 Sheets-Sheet 2

INVENTOR.
HARRY W. MOORE

BY

HIS ATTORNEYS

United States Patent Office

Re. 25,281
Reissued Nov. 6, 1962

25,281

APPARATUS FOR AND METHOD OF WINDING STATOR COILS

Harry W. Moore, 5051 Kittridge Road, Dayton 24, Ohio

Original No. 2,953,309, dated Sept. 20, 1960, Ser. No. 738,688, May 29, 1958. Application for reissue July 31, 1961, Ser. No. 128,642
14 Claims. (Cl. 242—1.1)

Matter enclosed in heavy brackets [ ] appears in the original patent but forms no part of this reissue specification; matter printed in italics indicates the additions made by reissue.

This invention relates to apparatus for and a method of winding coils upon inwardly directed pole pieces of a stator, although not necessarily so limited.

Coils have been wound on inwardly directed pole pieces of stators by coil winding machines for a long period of time. For example, the patent to Gysel No. 1,431,947 shows such a device. With this device, as far as understood, several steps of manual operations are required before and after winding each pole.

An object of this invention is to provide apparatus for and a method of winding coils upon internally directed pole pieces, wherein the entire operation is automatic. In winding internally directed poles, it is necessary to provide horn-like members or guides for guiding the wire across the end of the pole piece and for guiding the wire into the proper slots. This has been accomplished by providing horns for guiding the wires upon the poles, the two horns for each pole, which might be referred to as a set of horns, being separable; mechanism being provided for supporting one pair of horns, one for each pole located on the same side of the stator in a stationary position; and withdrawing and reinserting the two horns on the opposite side of the stator as a unit. The withdrawal and reinserting of the horns is accomplished by inserting a spacer between the two horns and providing detents or prongs projecting into the recesses in the horns to press the horns against the spacer, then withdrawing the horns from the opening in the stator, so as to permit removal of the stator. When the horns are in position, radially directed locking means are used in holding the horns in a fixed position with respect to the pole. When the horns have been inserted into the proper position, the locking means moving radially in slots provided therefor in the horns lock the horns in position so as to release the supporting means used in supporting the horns when unloading and reloading a stator.

Other objects and advantages reside in the construction of parts, the combination thereof, the method of manufacture and the mode of operation, as will become more apparent from the following description.

Figure 6:
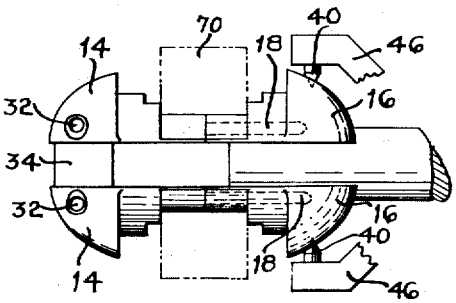

FIGURE 6 discloses the second pair of horns inserted on the opposite side of the stator.

Figure 7:
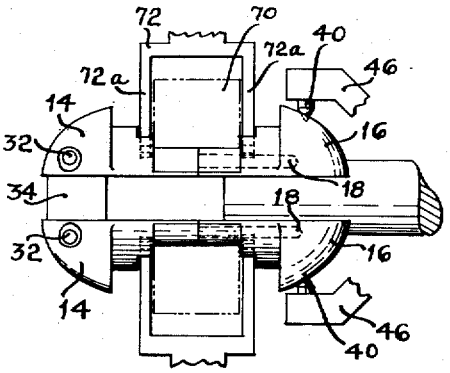

FIGURE 7 discloses two pairs of latching members used in holding the horns in position.

Figure 8:
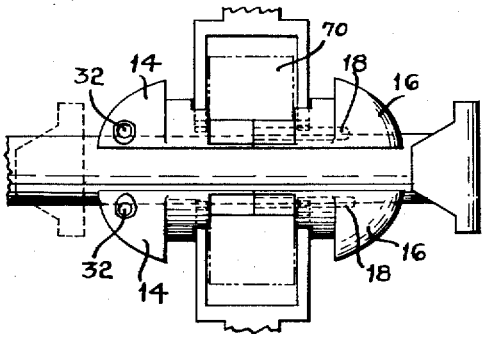

FIGURE 8 discloses a shuttle feeding the wire, which shuttle passes through the stator and between the sets of horns.

The apparatus disclosed herein illustrates the steps of carrying out the method of winding a stator by means of two pairs of horns when a two pole motor is used. If a four pole motor is used, then, of course, two extra pairs of horns would be required. The apparatus will now be described.

Figure 3:
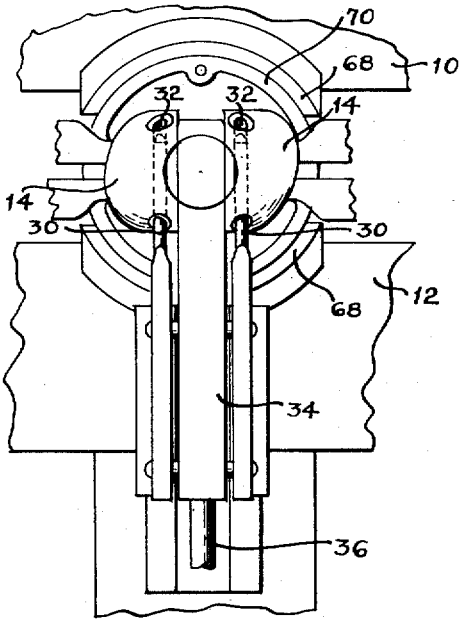
FIGURE 3 is an end elevational view of the stator looking in the direction of the end shown at the top of FIGURE 2.

A pair of horizontally arranged frame members 10 and 12 provide a main frame for supporting the stator and the horns used in winding coils. A pair of horns 14, these horns being identical, are located on one side of the stator. A second pair of horns 16 are positioned on the opposite side of the stator. The horns 14 are each provided with a pair of prongs 18 extending parallel to the axis of rotation of an armature, not shown, used in the stator. Each of the horns is provided with a reduced portion 14a projecting under the pole piece and having lips 14b integral with the portion 14a, the lips 14b being seated against the pole tips 20 of the two poles 22 diametrically arranged, as clearly seen in FIGURE 1. Each of the horns 16 is provided with a pair of apertures receiving the prongs 18. All of the horns have been provided with radial slots 24, each slot being provided with an inwardly directed flange 26. The two horns 14 are suspended or held in position when loading a stator by means of a pair of vertical pins 30 extending through apertures 32 in the horns 14. These pins 30 are connected to a bar 34, substantially square in cross sectional area, used as a spacer for holding the two horns 14 in fixed, spaced, parallel relationship when unloading and loading a stator. The vertical pins 30 and the spacer bar 34 are mounted upon a piston rod 36 that is movable upwardly into the position shown in FIGURE 3 and downwardly out of contact with the pole pieces 14, as will be more fully described later. The two horns 14 remain in the same position both when winding and when unloading and loading a stator upon the horns.

Two different types of spacers for the horns are provided, namely, one consisting of the bar 34 and the two pins 30.

The horns 16 are each provided with a recess for receiving a pointed prong or pin 40 used in pushing the horn 16 against a cylindrical spacer 42, the spacer 42 being connected to a reciprocatory member 44. The pins 40 are mounted upon levers 46 pivoted at 50, the upper ends of the levers being pivotally connected to links 52 at 54 that are controlled by a piston rod 56. As the piston rod is raised, as viewed in FIGURE 2, the pins 40 are seated in the recesses provided therefor in the horns 16 held in spaced relation by the spacer bar 42. The entire assembly is then withdrawn downwardly, as viewed in FIGURE 2, by retracting member 44 mounted between the guides 60 to withdraw the horns 16 and, when a new stator has been loaded, member 44 is raised upwardly, as viewed in FIGURE 2, to position the horns 16 on the side opposite the stator 70. When the stator has been inserted into winding position, a pair of clamping members 68 locks the stator in position.

Figure 1:
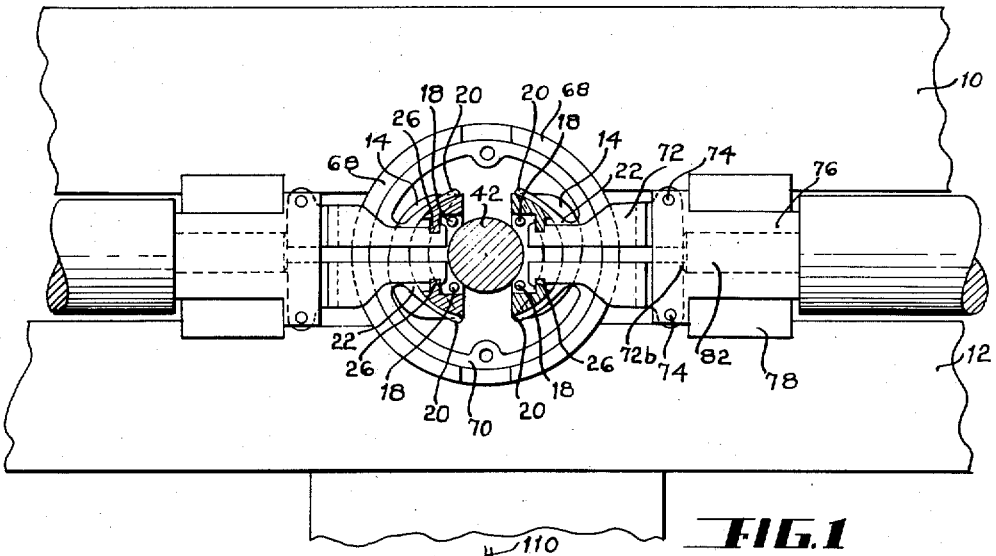
FIGURE 1 is a side elevational view with parts shown in section, taken substantially on the line 1—1 of FIGURE 2.
Figure 2:
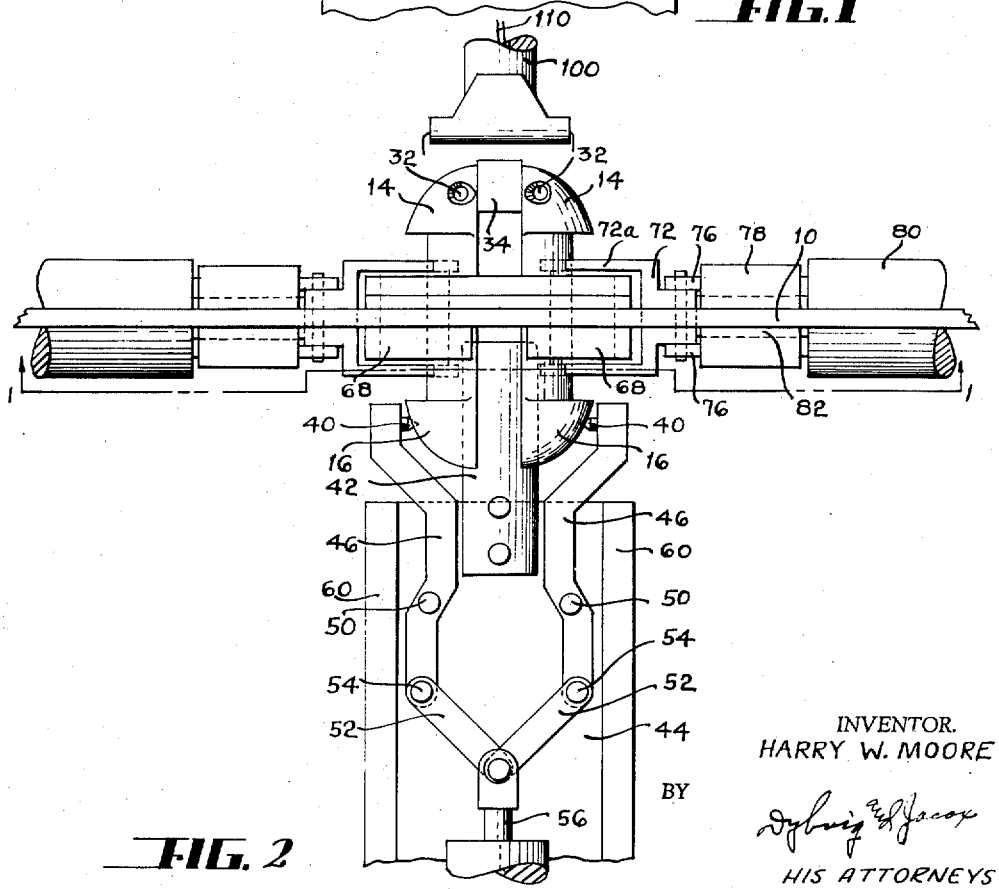
FIGURE 2 is a top plan view of a mechanism used in winding a coil.
Figure 4:
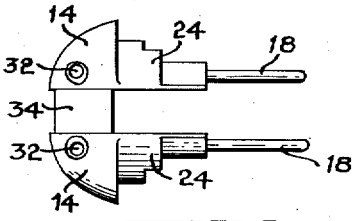
FIGURE 4 shows a pair of horns normally locked on one side of the stator held in suspension.
Figure 5:
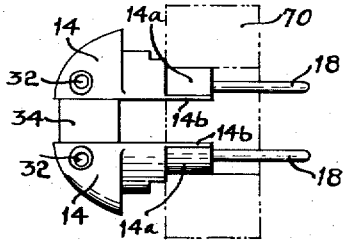
FIGURE 5 shows a stator in phantom mounted upon the pair of horns shown in FIGURE 4.

After the horns have been inserted, it is necessary to lock the horns in position before retracting the pins 30 and releasing the pins 40 from the horns. Pairs of latch members 72, each consisting of a pair of furcations 72a move in from opposite directions, as best illustrated in FIGURES 1 and 2, the furcations 72a each being provided with a notch into which the flanges 26 are seated. The latch members 72 are pivoted at 74 to a pair of links 76 extending through a housing 78 and fixedly attached to a piston rod 80. The piston rod 80 is hollow and has mounted therein a plunger 82. The plunger 82 pushes against the heels 72b of the latch members to hold the latch members 72 firmly against the flanges 26 in each of the horns. The latch members 72 are urged out of engagement with the flanges by suitable springs that have not been shown. The method of winding the stator poles beginning with the horns shown in FIGURE 4 consists of the following steps or operations.

While the two horns 16 are held in association with the frame members 10 and 12, which have not been shown in FIGURES 4, 5, 6, 7 and 8 for the purpose of clearness, the stator 70 is inserted and locked in position by the clamps 68. The stator is shown in phantom in FIGURE 5. After the stator has been inserted, the reciprocatory member 44 supporting the two horns 16, is then advanced into the position shown in FIGURE 7, placing the horns 16 upon the prongs 18. This is followed by advancing the two piston rods 80 towards the stator, so as to advance the collapsed latch members 72 into the slots 24, this being followed by advancing the plunger 82 against the heels 72b to move the latch members into the position shown in FIGURE 1, the piston rods 80 being held in position and the plunger 82 likewise being held in position, so as to lock the horns with respect to the stator.

When this has been done, the supporting mechanism for the two pairs of horns 14 and 16 is removed. These may be removed simultaneously, in that the horns are now firmly locked into position upon the latch members 72 and in association with the stator. The supporting mechanism for the horns 14 is lowered by retracting the piston rod 36, shown in FIGURE 3, and the supporting mechanism for the horns 16 is withdrawn axially by first withdrawing the piston rod or connecting rod 56 downwardly, as shown in FIGURE 2, so as to release the prongs 40 from the apertures or recesses in the horns 16. This is followed by withdrawing member 44 supporting the levers 46 and the spacer 42, so as to withdraw this entire assembly from the horns, which is followed by winding the coils.

This is accomplished by means of a shuttle mounted both for reciprocatory and oscillatory movements. This shuttle includes a hollow tube 100 having a pair of wires 110 fed from a suitable source of supply through the center of the tube and outwardly. The shuttle is reciprocated through the stator and oscillated beyond the horns in seriatim, both the reciprocatory movements and the oscillatory movements reversing directions alternately during each cycle of the shuttle, to thereby wind the windings on the poles. That is, the shuttle is passed between the two sets of horns. When the shuttle has passed through the stator and between both sets of horns, the shuttle is rotated through approximately 180°, then the shuttle is retracted from the stator, this being followed by rotation of the shuttle in the reverse direction through 180° to complete the winding of one turn on the poles. The foregoing cycle of the shuttle is repeated to continue winding the second turn on the poles. In each cycle of the shuttle, one wire is wound upon one pole piece and the other wire is wound upon the other pole piece. This is continued until the desired number of turns in each coil has been provided, when the operation of the shuttle is interrupted.

When this takes place, the pins 30 and the spacer bar 34 are raised, so as to again hold the two horns 14. The mechanism, including the pins 40, the lever 46 and the spacer bar 42, is then advanced into the position shown in FIGURE 2 to firmly grip the horns 16. The latch members 72 surrounding the ends of the pole coils are then withdrawn radially, so as to release the horns 14 and 16 from the stator. The horns 16 are then withdrawn and the stator unlocked by releasing the clamps 68. The stator may then be removed and a new stator inserted into position. The operation may then be repeated.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. The method of winding inwardly directed poles on a stator utilizing two pairs of horns, one pair being located on one side of the stator and the other pair being located on the other side of the stator, [temporary supports for one pair of horns,] and a wire feeding shuttle having wire feeding projections, said method including the steps of [fixedly supporting one pair of horns, inserting] *supporting* the stator [upon] *between* said [pair] *pairs* of [fixed] horns, [moving a second pair of horns into engagement with the stator,] one horn of each pair cooperating to provide guides for the winding of a pole, holding the two pairs of horns in fixed relation with respect to the stator, [removing the temporary supports of said one pair of horns,] and advancing the shuttle through the stator through reciprocatory movements and through oscillatory movements in seriatim, both movements reversing directions alternately during each cycle of the shuttle to thereby wind the windings on the poles.

2. The method of winding inwardly directed stator poles utilizing two pairs of horns, one pair being located on one side of the stator and the other pair being located on the other side of the stator, and a wire feeding shuttle having wire feeding projections, said method including the steps of [fixedly supporting one pair of horns, inserting] *supporting* the stator [upon] *between* said [pair] *pairs* of [fixed] horns, [moving a second pair of horns into engagement with the stator,] one horn of each pair cooperating to provide guides for winding a pole, locking the two pairs of horns in fixed relation with respect to the stator poles, and advancing the shuttle through the stator through reciprocatory movements and through oscillatory movements in seriatim, both movements reversing directions alternately during each cycle of the shuttle to thereby wind the windings on the poles.

3. The method of winding inwardly directed stator poles utilizing two pairs of horns, one pair being located on one side of the stator and the other pair being located on the other side of the stator, movably mounted latching means adapted to engage and lock the horns, said latching means extending radially when in use, and a wire feeding shuttle having wire feeding projections, said method including the steps of [fixedly supporting one pair of horns, inserting] *supporting* the stator [upon] *between* said [pair] *pairs* of [fixed] horns, [moving a second pair of horns into engagement with the stator,] one horn of each pair cooperating to provide guides for winding a pole, advancing the latching means inwardly into engagement with the horns for holding the horns against the poles, and advancing the shuttle through the stator through reciprocatory movements and through oscillatory movements in seriatim, both movements reversing directions alternately during each cycle of the shuttle to thereby wind the windings on the poles, which windings temporarily enclose the latching means.

4. The method of winding inwardly directed stator poles utilizing two pairs of horns, one pair being located on one side of the stator and the other pair being located on the other side of the stator, latching means movable radially into engagement with the horns when in use, and a wire feeding shuttle having wire feeding projections, said method including the steps of [fixedly supporting one pair of horns, inserting] *mounting* the stator [upon] *between* said [pair] *pairs* of [fixed] horns, [moving a second pair of horns into engagement with the stator,] connecting each horn of one pair to the corresponding horn of the other pair, one horn of each pair cooperating to provide guides for winding a pole, advancing the latching means inwardly to engage the horns to hold the horns in position, and advancing the shuttle through the stator through reciprocatory movements and through oscillatory movements in seriatim, both movements reversing directions alternately during each cycle of the shuttle to thereby wind the windings on the poles and temporarily enclose the latching means.

5. The method of winding inwardly directed stator poles according to claim 4, wherein after the poles have been wound each pair of horns are engaged to support the same, releasing and withdrawing the latching means and withdrawing one pair of horns to release the stator.

6. The method of winding inwardly directed stator poles according to claim 4, wherein the stator is clamped in position upon being mounted [upon] *between* said [pair] pairs of [fixed] horns.

7. A device for winding poles directed inwardly from a stator, said device including a pair of horns, said horns having parallel holes therein, a spacer member positioned between said horns and a pair of pins for holding said pair of horns in [a] fixed *spaced* position [to permit insertion of the stator upon said pair of horns], said pins extending through said holes, a second pair of horns, means for removably supporting the second pair of horns, *means for supporting the stator between said pairs of horns,* means carried by one pair of horns for interengaging the other pair of horns, means for locking the horns in fixed position with respect to the poles of the stator, and a shuttle mounted for reciprocatory and oscillatory movements in seriatim and alternately in the reverse directions for winding coils on the poles.

8. A device for winding poles directed inwardly from [the] *a* stator, said device including a pair of horns having parallel holes extending therethrough, a pair of parallel pins extending through said holes supporting said pair of horns in [a] fixed *spaced* position [to permit insertion of the stator upon said pair of horns], a second pair of horns having recesses therein, spacer means mounted between said second pair of horns, pins removably mounted and projecting into said recesses for clamping said second pair of horns against the second spacer member, *means for supporting the stator between said pairs of horns,* means for locking the horns in fixed position with respect to the poles of the stator so as to permit removal of the pins and the spacer members, and a shuttle mounted for reciprocatory and oscillatory movements in seriatim and alternately in the reverse direction for winding coils on the pole pieces.

9. A device for winding poles directed inwardly from the stator according to claim 8, wherein means for locking the horns in fixed position with respect to the poles of the stator includes a plurality of latch members extending radially inwardly and parallel to the poles.

10. A device for winding poles directed inwardly on the stator according to claim 8, wherein the means for locking the horns in fixed position with respect to the poles of the stator includes a plurality of pairs of yokes, the arms of which includes latching means, the yokes being pivotally mounted and means for biasing the yokes away from engagement with the horns, and means for actuating the latching means into engagement with the horns.

11. A device for winding poles directed inwardly on a stator, said device including two pairs of horns, removable means for supporting one pair of horns one one side of the stator to permit insertion of the stator upon said pair of horns, movable means for supporting the other pair of horns, means carried by one pair of horns for interengaging the other pair of horns, *means for mounting the stator between said pairs of horns,* means for locking the horns in fixed position with respect to the poles of the stator to release the supporting means *for removal* from both pairs of horns, and a shuttle mounted for reciprocatory and oscillatory movements in seriatim and alternately in reverse directions for winding coils on the poles.

12. A device for winding poles directed inwardly on the stator according to claim 11, wherein the horns are provided with latch engaging flanges and wherein the means for locking the horns in fixed position with respect to the poles of the stator includes a pair of means, each of said pair of means including a pair of bifurcated members, the furcation of each member being provided with a latch adapted to engage one flange of each horn.

13. A device for winding poles directed inwardly on the stator according to claim 11, wherein the means for engaging both pairs of horns are removable and the horns are supported by the locking means so as to hold the horns against the poles of the stator when winding the poles.

14. A device for winding poles directed inwardly on the stator according to claim 11, wherein the horns of one pair are provided with pins extending towards the other pair and wherein said other pair of horns are provided with apertures for receiving the pins to thereby hold the horns together.

References Cited in the file of this patent or the original patent

UNITED STATES PATENTS

| | | |
|---|---|---|
| 1,431,947 | Gysel | Oct. 17, 1922 |
| 2,738,136 | Bugg | Mar. 13, 1956 |
| 2,847,170 | Lill et al. | Aug. 12, 1958 |